United States Patent [19]

Tuzson

[11] 4,088,459

[45] May 9, 1978

[54] SEPARATOR

[75] Inventor: John Janos Tuzson, Evanston, Ill.

[73] Assignee: Borg-Warner Corporation, Chicago, Ill.

[21] Appl. No.: 752,499

[22] Filed: Dec. 20, 1976

[51] Int. Cl.² ............................................. B01D 53/24
[52] U.S. Cl. ........................................ 55/203; 55/403; 166/105.5
[58] Field of Search ......................... 55/199, 201–203, 55/403, 406; 166/105.5

[56]  References Cited

U.S. PATENT DOCUMENTS

| | | | |
|---|---|---|---|
| 2,285,169 | 6/1942 | Pyle | 166/105.5 |
| 2,311,963 | 2/1943 | Pyle | 55/199 X |
| 3,256,986 | 6/1966 | Woosnam | 55/406 X |
| 3,282,031 | 11/1966 | Vos et al. | 55/203 |
| 3,300,950 | 1/1967 | Carle | 55/199 |
| 3,624,822 | 11/1971 | Carle et al. | 166/105.5 X |
| 3,887,342 | 6/1975 | Bunnelle | 55/203 |

FOREIGN PATENT DOCUMENTS 1,025,380  3/1958  Germany .................... 55/199

*Primary Examiner*—Charles N. Hart
*Assistant Examiner*—Robert H. Spitzer
*Attorney, Agent, or Firm*—Aubrey L. Burgess

[57]  ABSTRACT

A separator assembly for separating different density fluids, such as gas and liquid, which comprises three stages, i.e., an inducer stage, a mixed flow impeller stage, and a centrifugal separator stage. The assembly is usually associated with a pump or pumps for pumping the separated fluids from the assembly. The inducer stage comprises a screw means which, with the impeller stage, delivers fluid to be separated into the separator stage. The impeller stage imparts rotary motion to the fluid. The centrifugal separator stage is a centrifuge and comprises inner and outer cylindrical members which rotate in unison and wherein centrifugal force on the fluid separates the heavier and lighter components, which components flow from the separator stage to the associated pump or pumps.

12 Claims, 3 Drawing Figures

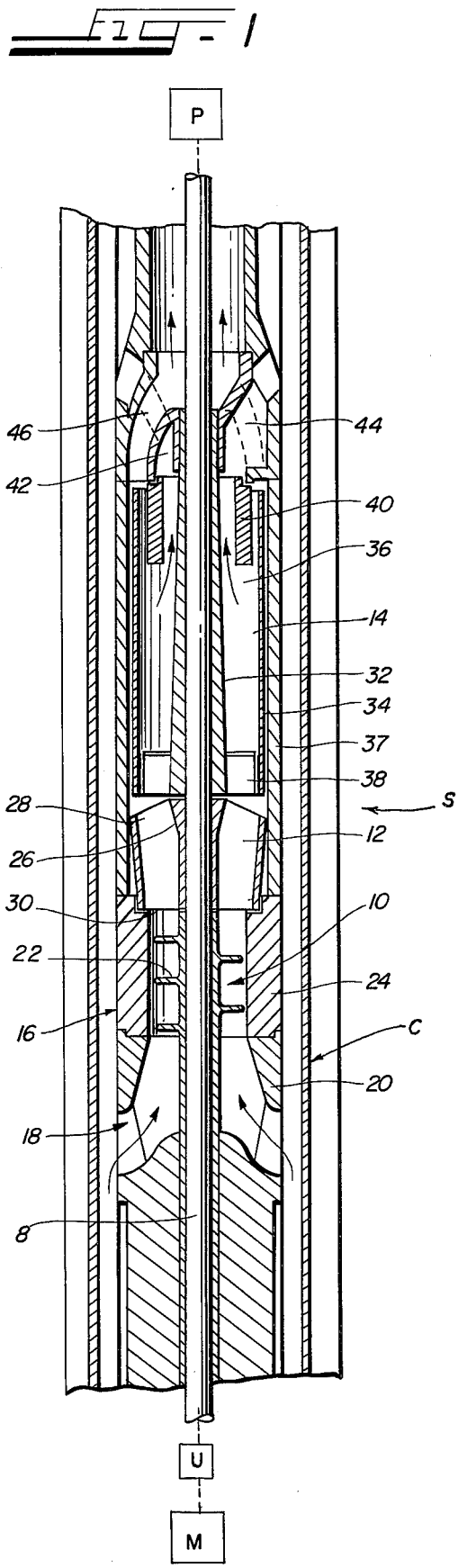

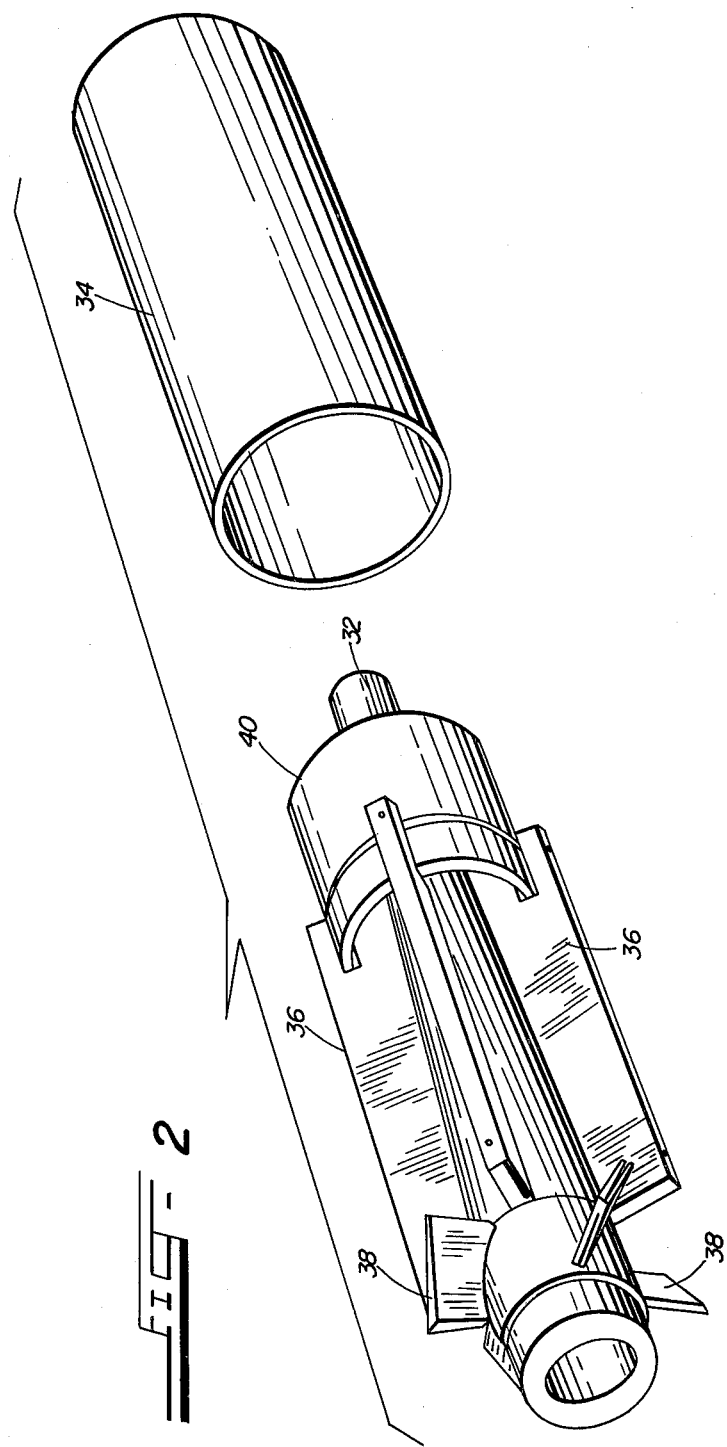

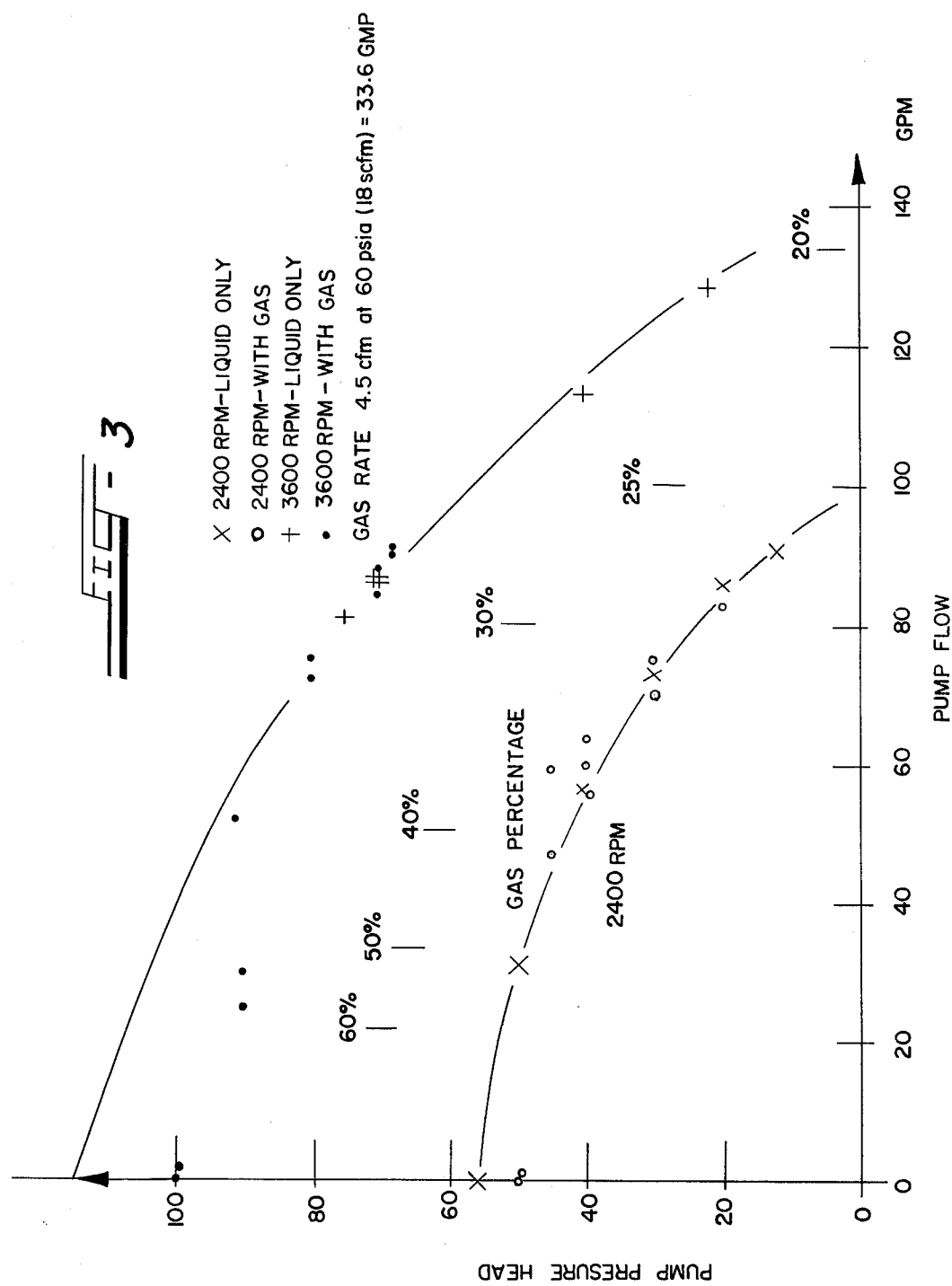

SEPARATOR

BACKGROUND OF THE INVENTION

The invention described herein relates to separators for separating fluids of different densities and especially to gas separators, i.e., a separator for separating the liquid and gaseous phases encountered in oil and water wells and of the type associated with a submersible motor-pump assembly.

It has long been a practice to use a submersible motor-pump assembly in a well casing of a water or oil well to pump well fluid from the well. In many instances, substantial quantities of gaseous substances are present in the well fluid which can adversely affect the pumping operation if permitted to enter the pump of the assembly. In extreme situations, excessive quantities of gas or excessive expansion of a gaseous phase will cause "gas lock" which completely restricts the flow of the well fluid, i.e., oil or water. When "gas lock" occurs, the pump must be shut down for later restart. The necessary procedure can be costly and time consuming. A common practice in the industry is to incorporate a gas separator in the motor-pump assembly, the separator being located in advance of the pump inlet. Ideally, the separator reduces the occurance of "gas lock" and permits the motor-pump to operate continuously and efficiently.

Examples of gas separators are shown in U.S. Pat. Nos. 2,311,963; 3,291,057; 3,300,950; 3,624,822 3,867,056; and 3,887,342. While at least some of the patented structures have been effective to reduce "gas lock", the efficiency of gas removal may be somewhat questionable and, in any, event, can be improved.

THE INVENTION

The separator assembly of this invention is generally located, as those of the prior art, at the inlet of the pump of a submersible motor-pump assembly and its component parts are drivingly connected to the motor shaft. In some installations, the separator assembly can be supplied as the balk-on unit for incorporation between the motor and the pump and with shaft portions which connect the motor shaft to the pump shaft, so as to drivingly connect to the motor-pump.

The separator assembly of this invention comprises three stages connected in series and in a particular sequence, i.e., an inducer stage, an impeller stage and a centrifgal separator stage, the first two stages delivering sufficient quantity of the fluid mix to the third stage at somewhat increased pressure which avoids expansion of the gaseous phase of the mixture and reduces materially any "gas-lock" in the pump.

The first stage or inducer stage comprises a helical screw; the second stage or impeller stage comprises a mixed flow impeller which imparts rotary motion to the fluid mix; the third stage or centrifugal separator stage comprises inner and outer cylinders connected by vanes, so as to be rotatable in unison. Additional angled vanes may be incorporated in the separator stage to supplement the action of the mixed flow impeller and increase the rotary motion of the fluid mix to the level of rotation existing in the separator. The liquid phase being heavier than the gaseous phase is separated from the mix and is thrown outwardly to the outer cylindrical member for removal while the lighter phase is removed centrally of the assembly. Because the inner and outer cylindrical members rotate in unison, turbulence in the mixture is substantially reduced and/or minimized. Turbulence is undesirable because it encourages mixing and not separation of the fluids. A device containing cross-over passages directs the separated components, i.e., the liquid phase to the pump inlet and the gaseous phase to the casing.

An important feature in the assembly of this invention is the relationship between the liquid outlet from the separator assembly and the mixture inlet into the separator. The outlet and inlet are each essentially an annulus. The outlet passage annulus is preferably located at a larger distance from the center of rotation than the inlet, which insures the flow of the liquid to and through the outlet and not rewardly along the outer cylinder wall to the inlet.

The capacity of the separator assembly must necessarily be greater than that of the pump in order to supply the pump with sufficient liquid to insure maximum pump efficiency.

THE DRAWINGS

FIG. 1 is a longitudinal sectional view of the apparatus of this invention;

FIG. 2 is an enlarged, exploded, perspective view of the centrifugal separator stage of the apparatus illustrated;

FIG. 3 is a curve of experimental data for pump performance using the separator assembly of this invention.

DETAILED DESCRIPTION

FIG. 1 of the drawing illustrates the general arrangement of the separator assembly S located between a submersible motor M and a pump P which are connected by a shaft 8. A seal section U is generally associated with motor M. The entire assembly of motor M, seal section U, separator S and pump P is illustrated in operational position in a casing C of a well. Because the motor M, the seal section U and the pump P are well known in the art, a detailed description of each is considered unnecessary and the detailed description will be specifically directed to the separator assembly S, which as before stated, comprises three stages in a particular sequence, i.e., and inducer stage 10, an impeller stage 12 and a centrifugal separator stage 14. The assembly S is contained within a multiple part housing 16 having inlets 18 adjacent one end in a housing part 20. The inducer stage 10 comprises a helical screw 22 connected for rotation to the shaft 8 and within a housing part 24. A function of this stage, in addition to conveying fluid is to pressurize the fluid, preventing expansion of the gaseous phase thereof. The impeller stage 12 comprises a member 26 having guide vanes 28 which is connected for rotation to the shaft 8. The impeller stage 12 imparts a degree of rotary motion to the fluid from the inducer screw 22 to the inlets 30 of the impeller stage 12. The impeller stage may be of multiple impeller construction without departing from the spirit of this invention.

The centrifugal separator stage 14 comprises inner and outer members 32 and 34 joined by one or more elongated generally radially directed vanes 36 forming segmented cavities for fluid, and is housed in a housing part 37. The inner member 32 is connected for rotation with the shaft 8 such that the entire assembly rotates with the shaft 8. Adjacent the inlet end of the stage 14, there are a plurality of vanes 38 which are angled with respect to the members 32 and 34 and which impart additional rotary motion to the well fluid entering the stage from the impeller. The vanes 36 and the unitary rotation of the members 32 and 34 avoid turbulence in the well fluid and permit centrifugal force to separate the lighter and heavier components from each other. Adjacent the exit end of the separator stage 14 is an intermediate cylindrical member 40 which provides the outlet for the separated components. The lighter fluid component flows to the inside while the heavier fluid flows to the outside.

Adjacent the outlet of the separator stage 14 on the embodiment illustrated is a stationary cross-over casting 42 which directs the separated fluids as desired. Here in the specific embodiment being described, the gaseous components are directed to a location between the well casing and the separator assembly S via passages 44 for ultimate removal; the liquid components are directed inwardly via passages 46 to the inlet of the pump (not shown).

It is to be noted that the outlet defined by the outer member 34 and the intermediate member 40 is at a greater distance from the center of rotation than the outlet of the inducer stage 10; this prevents "run-back" of fluid to the inducer stage 10 which would seriously affect the efficiency of the unit.

Attention is now directed to FIG. 3 which is a set of curves for a particular pump and in which pump pressure head is plotted against pump flow.

The pump was connected to a separator assembly constructed according to this invention and operated at 3600 RPM and at 2400 RPM. At each speed, the pump was run with a liquid only supply and also with gas injected into the liquid supply. Gas, when injected, was injected at a rate of 4.5 cfm at 60 psia which is equal to 33.6 GPM. The indicia for the plotted points is noted on the drawing figure.

From these tests, it may be concluded that gas separation by the device tested was at or substantially 100%. It is to be noted that this laboratory experimental data can be duplicated precisely in the laboratory. It is virtually impossible to compare precise data from operating oil wells because of the uncertainty of substantially identical conditions; however, from laboratory tests it can be concluded that under actual operating conditions, the separator assembly of this invention should perform with outstanding results.

While the invention has been described with respect to the separation of liquid and gaseous phases of a mixture, it is to be understood that the invention may be used for separating different density liquids or different density gases.

I claim:

1. A separator assembly for separating fluids of different densities from a mixture thereof comprising:
    an inducer, an impeller and a centrifugal separator means;
    said inducer, impeller and separator means being arranged in series sequence;
    a housing for said assembly having an inlet for fluid to said inducer and first and second outlets from said separator means for separated fluid;
    means for actuating said inducer, said impeller and said separator means;
    said inducer delivering fluid from said inlet to said impeller;
    said impeller delivering fluid from said inducer to said separator means and imparting rotary motion thereof;
    said centrifugal separator means comprising rotatable inner and outer cylindrical members and at least one longitudinal vane joining said inner and outer cylindrical members for centrifuging said fluid delivered from said impeller to separate the fluid into different density components which flow to and from said outlets.

2. A separator assembly as recited in claim 1 wherein said inducer comprises a screw which pressurizes fluid from said inlet to said inducer.

3. A separator assembly as recited in claim 1 wherein said impeller comprises vane means.

4. A separator assembly as recited in claim 1 further comprising a plurality of longitudinal vanes joining said inner and outer cylindrical members for concurrent rotation and dividing the volume between said inner and outer members into individual zones in which centrifuging occurs.

5. A separator assembly as recited in claim 4 further comprising a plurality of vanes angled with respect to said longitudinal vanes and imparting rotary motion to fluid entering said centrifuging zones.

6. A separator assembly as recited in claim 1 wherein said first and second outlets comprise means defining first and second anvils, said defining means comprising an intermediate cylindrical member positioned between said inner and outer cylindrical members.

7. A separator assembly as recited in claim 6 wherein said first outlet is defined by said outer and intermediate cylindrical members and wherein the inner diameter of said first outlet is larger than the diameter of said inducer.

8. A separator assembly for use in a well and associated with a submersible pump and motor connected by a shaft, said assembly being adapted to separate gas and liquid from well fluid comprising, in sequence:
    an inducer, an impeller, and a centrifugal separator means;
    said assembly being arranged in a housing having an inlet for said well fluid to said inducer and a first and second outlet communicating with said separator means; said first outlet being provided for the flow of liquid to an inlet for said pump means and said second outlet being provided for the flow of gas;
    said inducer comprising a screw for delivering well fluid from said inlet to said impeller and under pressure;
    said impeller comprising a vaned member to receive well fluid from said inducer and deliver it with rotary motion to said separator means;
    said centrifugal separator means comprising inner and outer cylindrical members connected by at least one longitudinal vane for concurrent rotation;
    said members of said separator means being connected to said shaft whereby centrifugal force causes separation of the gas and liquid from said well fluid upon rotation of said separator means which flow from said separator means to and through said outlet means.

9. A separator assembly as recited in claim 8 further comprising a plurality of longitudinal vanes forming connections between said inner and outer cylindrical members and dividing the zone therebetween into compartments in which well fluid is centrifuged without undue mixing.

10. A separator assembly as recited in claim 9 further including additional vanes in said separator means angled with respect to said longitudinal vanes to further impart rotary motion to well fluid being delivered to said compartments for centrifuging.

11. A separator assembly as recited in claim 10 wherein said first and second outlets comprise means defining first and second anvils, said defining means comprising an intermediate cylindrical member positioned between said inner and outer cylindrical members.

12. A separator assembly as recited in claim 11 wherein said first outlet is defined by said outer and intermediate cylindrical members and wherein the inner diameter of said first outlet is larger than the diameter of said inducer.

* * * * *